US011260810B2

(12) United States Patent
Yasunori (10) Patent No.: US 11,260,810 B2
(45) Date of Patent: Mar. 1, 2022

(54) DISTRIBUTOR AND ON-BOARD SYSTEM

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventor: Hiromichi Yasunori, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/616,191

(22) PCT Filed: Apr. 16, 2018

(86) PCT No.: PCT/JP2018/015654
§ 371 (c)(1),
(2) Date: Nov. 22, 2019

(87) PCT Pub. No.: WO2018/230132
PCT Pub. Date: Dec. 20, 2018

(65) Prior Publication Data
US 2020/0180530 A1 Jun. 11, 2020

(30) Foreign Application Priority Data
Jun. 12, 2017 (JP) .............................. JP2017-114884

(51) Int. Cl.
*B60R 16/023* (2006.01)
*B60R 16/02* (2006.01)
*H02J 1/00* (2006.01)

(52) U.S. Cl.
CPC ...... *B60R 16/0238* (2013.01); *B60R 16/0207* (2013.01); *H02J 1/00* (2013.01)

(58) Field of Classification Search
CPC ... B60R 16/023; B60R 16/02; B60R 16/0207; B60R 16/0238; B60R 16/03; H02J 1/00; H02J 2310/46; B60K 6/46; B60L 15/20
(Continued)

(56) References Cited

U.S. PATENT DOCUMENTS

2006/0097577 A1* 5/2006 Kato .................... F02N 11/0866
307/10.1
2007/0202717 A1* 8/2007 Vera .................... B60R 16/0238
439/76.2
(Continued)

FOREIGN PATENT DOCUMENTS

JP 2002-274292 A 9/2002
JP 2007-237868 A 9/2007
(Continued)

OTHER PUBLICATIONS

May 15, 2018 Search Report issued in International Patent Application No. PCT/JP2018/015654.

*Primary Examiner* — Toan T Vu
(74) *Attorney, Agent, or Firm* — Oliff PLC (57) ABSTRACT

A distributor configured to be connected to a power supply wire laid in a vehicle, a load for the vehicle to be supplied with power from the power supply wire, and configured to be connected to an operation signal line through which operation information serving as a reference for determining whether to operate or stop the load is transmitted, the distributor including: an electronic control unit configured to distribute power that is supplied from the power supply wire to the load, based on the operation information, wherein the electronic control unit is disposed at a corner of the vehicle.

14 Claims, 5 Drawing Sheets

(58) Field of Classification Search
USPC ......... 307/9.1, 10.1, 10.3, 10.5, 10.7, 66, 42
See application file for complete search history.

(56) References Cited

U.S. PATENT DOCUMENTS

| | | | |
|---|---|---|---|
| 2007/0225873 A1* | 9/2007 | Toya | H04L 12/66 |
| | | | 701/1 |
| 2011/0231042 A1* | 9/2011 | Ueda | B60L 3/0084 |
| | | | 701/22 |
| 2012/0255799 A1* | 10/2012 | Kohler | B60L 50/62 |
| | | | 180/65.245 |
| 2014/0297109 A1 | 10/2014 | Shimomura et al. | |
| 2015/0291148 A1* | 10/2015 | Sakai | B60W 10/08 |
| | | | 701/22 |
| 2016/0304041 A1* | 10/2016 | Lennevi | B60L 1/00 |
| 2016/0322737 A1* | 11/2016 | Eder | H01R 13/113 |
| 2017/0355327 A1 | 12/2017 | Hida et al. | |

FOREIGN PATENT DOCUMENTS

| | | | |
|---|---|---|---|
| JP | 2012-054688 A | 3/2012 |
| JP | 2014-024417 A | 2/2014 |
| JP | 2014-193654 A | 10/2014 |
| JP | 2016-060427 A | 4/2016 |
| JP | 2016-120901 A | 7/2016 |

* cited by examiner

FIG. 5

DISTRIBUTOR AND ON-BOARD SYSTEM

BACKGROUND

The present disclosure relates to a distributor that distributes power and information in a vehicle and an on-board system.

JP 2014-193654A discloses a gateway that relays transmission/receiving of information between a plurality of in-vehicle networks provided in a vehicle. JP 2016-120901A discloses an power supply apparatus for automobiles that supplies power to loads via a wiring harness, using a metal wire extending in a center portion of a floor surface, as a backbone power supply line.

"Front line of router development vol. 9, Ring protocol for realizing redundant LAN path, [1], Uniquely developing mechanism, and building it into hardware to perform high-speed processing, For constructing reliable network (no. 3)", [online], Jan. 14, 2009, Nikkei NETWORK, [retrieved on May 1, 2017], Internet (URL: http://itpro.nikkeibp.co.jp/article/COLUMN/20090105/322216/) discloses a technique for building a redundant configuration for transmitting/receiving information.

SUMMARY

The gateway described in JP 2014-193654A functions as a distributor that distributes information between a plurality of in-vehicle networks. However, if such a distributor and a distributor that distributes power to loads in the plurality of in-vehicle networks are provided separately in an automobile, there has been the issue that members (e.g., a wiring harness and communication lines) that constitute the in-vehicle networks increases.

In addition, in a configuration in which a backbone power supply line is routed over a center portion of a floor surface as in the power supply apparatus described in JP 2016-120901A, when connecting the backbone power supply line and loads, there has been the issue that the routing needs to reach the center portion. In particular, if a load that is added afterwards is disposed at a corner of the vehicle, such an increase in the routing distance is significant. This leads to an increases in the number of members that constitute in-vehicle networks.

An exemplary aspect of the disclosure provides a technique that makes it possible to reduce the number of members that constitute in-vehicle networks.

A distributor according to an exemplary aspect is connected to a power supply wire laid in a vehicle, a load for the vehicle to be supplied with power from the power supply wire, and configured to be connected to an operation signal line through which operation information serving as a reference for determining whether to operate or stop the load is transmitted, the distributor including an electronic control unit configured to distribute power that is supplied from the power supply wire to the load, based on the operation information.

In the present disclosure, a distributor has a function of communicating the operation information using the operation signal line, and a function of distributing power to the load for a vehicle based on this operation information. Thus, it is possible to reduce the number of members that constitute in-vehicle networks, compared with an aspect in which these functions are separately provided.

In addition, in the present disclosure, the distributor is arranged at a corner of a vehicle. Thus, even when adding a load at a corner of the vehicle afterwards, it is possible to suppress the routing distance of a member that connects the distributor and the load.

DETAILED DESCRIPTION OF EMBODIMENTS

Figure 1:
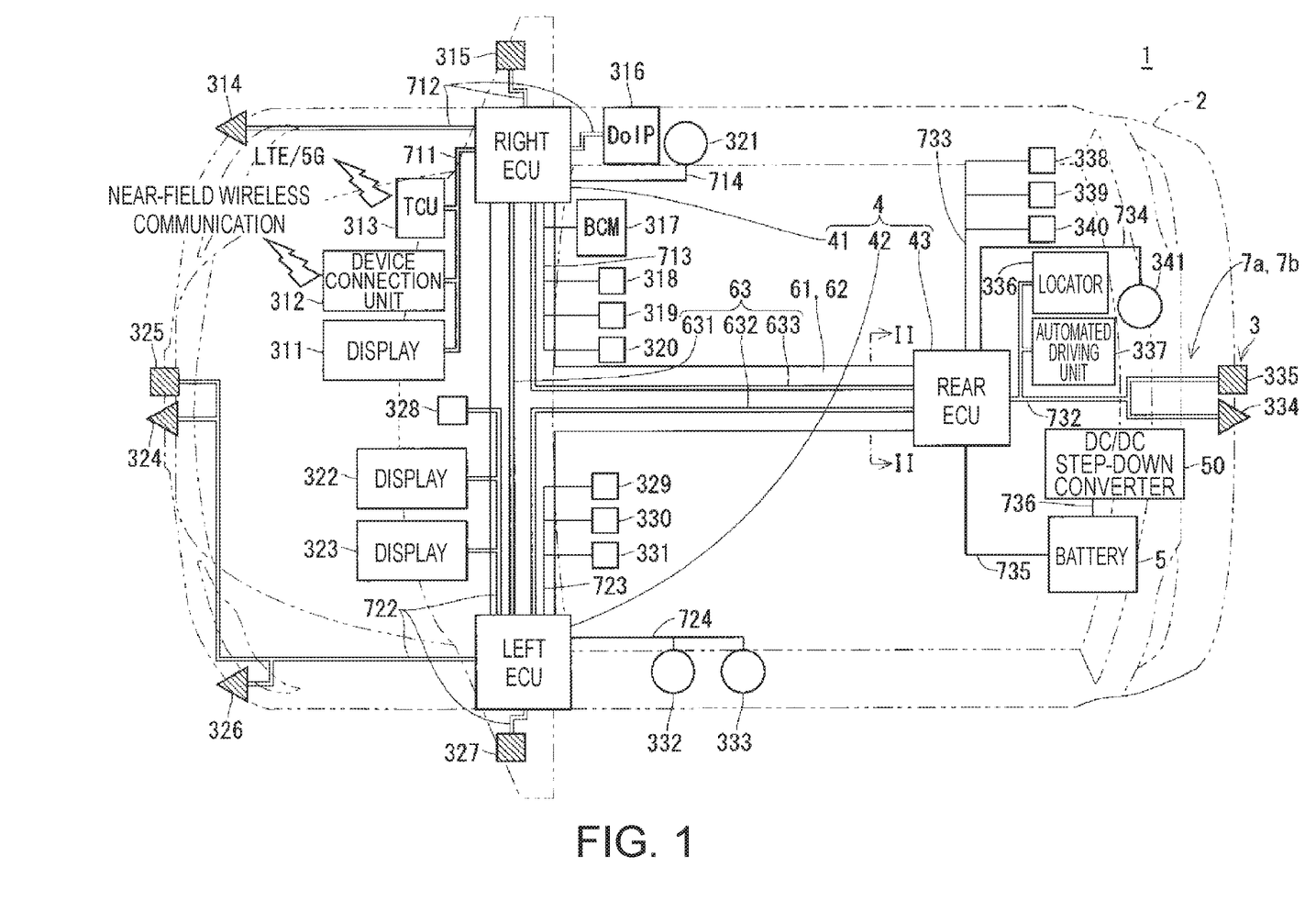
FIG. 1 is an explanatory diagram schematically illustrating a configuration example of an on-board system.

FIG. 1 is an explanatory diagram schematically illustrating a configuration example of an on-board system 1. The on-board system 1 is a system mounted in a vehicle 2, and includes a plurality of loads 3 for a vehicle, which are to be supplied with power, three ECUs 4 that control operations of the loads 3, and a battery 5 that is a power supply source.

"ECU 4" is a conceptual term that collectively refers to a right ECU (Engine Control Unit) 41 provided at a corner on the front right side of the vehicle 2, a left ECU 42 provided at a corner on the front left side of the vehicle 2, and a rear ECU 43 provided at a corner on the back central side of the vehicle 2. In this manner, the three ECU 4 are each provided at a corner in the back and forth direction or in the width direction of the vehicle 2. Note that "corner" of the vehicle 2 is a conceptual term that includes not only a corner on the floor surface but also a corner of the roof.

The three ECUs 4 are connected by power supply wires 61 and 62 so as to be able to supply power, and are connected by three communication lines 63 so as to enable information communication. More specifically, the power supply wires 61 and 62 connect the three ECUs 4 to each other, and each of the communication lines 63 connects two out of the three ECU 4 to each other.

The power supply wire 61 includes a portion that extends in the width direction of the vehicle and links the right ECU 41 and the left ECU 42, and a portion that extends in the back and forth direction of the vehicle 2 and links the central position of the above-mentioned portion and the rear ECU 43, and the power supply wire 61 is laid in the vehicle 2 in a T-shaped manner in a planar view. The power supply wire 62 is laid in a T-shaped manner similar to the power supply wire 61, and FIG. 1 shows a state where the power supply wire 62 overlaps the power supply wire 61 in a planar view.

"Communication line 63" is a conceptual term that collectively refers to a communication line 631 that connects the right ECU 41 and the left ECU 42, a communication line 632 that connects the left ECU 42 and the rear ECU 43, and a communication line 633 that connects the rear ECU 43 and the right ECU 41. FIG. 1 shows a state where the three communication lines 63 overlap the power supply wires 61 and 62 in a planar view. For example, the power supply wire 61 is arranged on the body side of the vehicle 2, and the power supply wire 62 is sandwiched between the communication lines 63 and the power supply wire 61.

Figure 2:
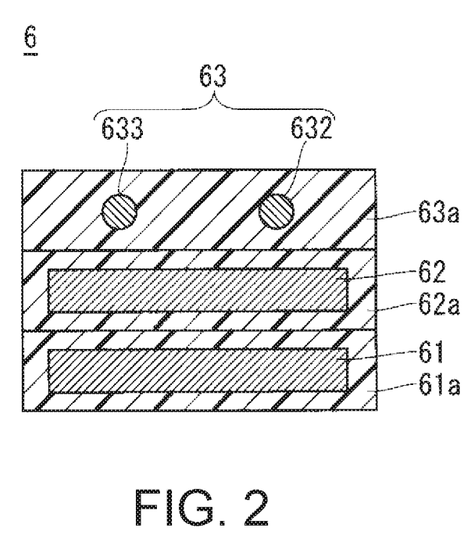
FIG. 2 is a longitudinal cross-sectional view of a configuration example of a main power supply line.

FIG. 2 is a longitudinal cross-sectional view of the power supply wires 61 and 62 and the communication lines 63 viewed from a cross section that is cut along II-II in FIG. 1.

Note that, in FIG. 2, two out of the three communication lines 63 (specifically, communication lines 632 and 633) are illustrated.

As shown in FIG. 2, the power supply wire 61 and an insulation coating 61a provided in the periphery of the power supply wire 61, the power supply wire 62 and an insulation coating 62a provided in the periphery of the power supply wire 62, and the two communication lines 63 and an insulation coating 63a provided in the periphery of the two communication lines 63 are layered. In FIG. 1, for ease of illustration, the insulation coatings 61a to 63a are omitted.

The power supply wire 61 has a flat shape in a cross section perpendicular to the extending direction thereof (the back and forth direction in FIG. 1.

The power supply wire 61 is formed of a conductive material. For example, a metal such as copper, a copper alloy, aluminum, or an aluminum alloy can be adopted as the material of the power supply wire 61. The insulation coating 61a covers (the entirety of) the periphery of the power supply wire 61 in a cross section orthogonal to the extending direction thereof. For example, one end of the power supply wire 61 is connected to the battery 5, and the power supply wire 61 is used as a positive or negative main power supply line.

The power supply wire 62 and the insulation coating 62a are configured similarly to the power supply wire 61 and the insulation coating 61a. For example, one end of the power supply wire 62 is grounded, and the power supply wire 62 is used as main line for grounding.

The power supply wires 61 and 62 are provided in parallel with each other. More specifically, the power supply wires 61 and 62 are layered so as to oppose the face of the power supply wire 61 that is on the upper side in the figure to the face of the power supply wire 62 that is on the lower side in the figure, via the insulation coatings 61a and 62a.

The two communication lines 63 have a circular cross section, for example, and are formed of a conductive material. For example, a metal such as copper, a copper alloy, aluminum, or an aluminum alloy can be adopted as the material of the communication lines 63. The two communication lines 63 may have a flat shape in a cross section perpendicular to their extending direction, similarly to the power supply wires.

For example, the two communication lines 63 are provided in parallel with each other, and are spaced apart along the width direction (the right-left direction in FIG. 2) of the power supply wires 61 and 62. The insulation coating 63a covers (the entirety of) the periphery of the two communication lines 63, in a cross section orthogonal to the extending direction of the two communication lines 63.

The two communication lines 63 are provided in parallel with the power supply wires 61 and 62. More specifically, the communication lines 63 are layered over the power supply wires 61 and 62 so as to oppose the upper face of the power supply wire 62 to the lower faces of the two communication lines 63 via the insulation coatings 62a and 63a.

The arrangement relationship between the power supply wires 61 and 62 and the communication lines 632 and 633 has been described so far, but the arrangement relationship between the power supply wires 61 and 62 and the communication lines 631 and 632 and the arrangement relationship between the power supply wires 61 and 62 and the communication lines 633 and 631 are also similar to the above-described arrangement relationship. In this manner, the three ECU 4 are connected by the space-saving power supply wires 61 and 62 and three communication lines 63 arranged in a T-shaped manner in a planar view, so as to enable power supply and information communication. The three communication lines 63 are used as main lines for transmitting operation information to be described later.

For example, the 1G Ethernet (1 Giga_Ethernet, hereinafter, referred to as "1G Ether") is used as the communication method of the three communication lines 63. Thus, in this communication method, the communication band is wider, and communication of a large capacity can be performed more stably, than CAN (Controller Area Network), CAN FD (CAN with Flexible Data Rate), or 100M Ethernet (100 Mega_Ethernet, hereinafter referred to as "100M Ether"), which will be described later. Note that "Ethernet" is a registered trademark.

The ECUs 4 supply power respectively to the loads 3 connected thereto via branch lines 7a, and perform information communication with the loads 3 connected thereto via branch lines 7b, respectively, and function as control units that control the loads 3. In the present specification, "main line" is a term used for an power supply wire or a communication line that connects ECUs 4 with each other, and "branch line" is a term used for an power supply wire or a communication line that connects an ECU 4 and a load 3. Specifically, "branch line 7a" refers to a branch line of an power supply wire, and is a conceptual term that collectively refers to branch lines 714, 724, and 734, which will be described later. "Branch line 7b" refers to a branch line of a communication line, and is a conceptual term that collectively refers to branch lines 711 to 713, 722, 723, 732, and 733, which will be described later.

A display 311 for the Internet, a device connection unit 312 for connection to an external device through Bluetooth or Wi-Fi wireless communication (indicated by "near-field wireless communication" in the figure), and a TCU (Telematics Control Unit) 313 for connection to an external device through LTE (Long Term Evolution) or 5G (5th Generation) (indicated by "LTE/5G" in the figure) are connected as loads 3 to the right ECU 41. For example, 1G Ether is used as the communication method of the branch lines 711 that connect the right ECU 41 and these loads 3. Thus, in this communication method, the communication band is wider and communication of a large capacity can be performed more stably than CAN or CAN FD, or 100M Ethernet, which will be described later. Note that "Bluetooth" and "LTE" are registered trademarks.

In addition, a unit 314 that adopts LIDAR (Light Imaging Detection and Ranging) for performing image detection and ranging through remote sensing in which light in front of the vehicle 2 on its right is used (hereinafter, simply referred to as "LIDAR"), a camera 315 for capturing an image on the right side of the vehicle 2, a unit 316 that adopts DoIP (Diagnostics over Internet Protocol) for diagnosing the vehicle through Ethernet communication (hereinafter and in the drawing, simply referred to as "DoIP") are connected as loads 3 to the right ECU 41. For example, 100M Ether is used as the communication method of the branch lines 712 that connect the right ECU 41 and these loads 3.

Also, a BCM (Body Control Module) 317 that detects operation information of loads and various loads 318 to 320 are connected as loads 3 to the right ECU 41. For example, CAN or CAN FD is used as the communication method of the branch lines 713 that connect the right ECU 41 and these loads 3.

In addition, a load 321 is connected as a load 3 to the right ECU 41. The branch line 714 that connects the right ECU 41 and the load 321 functions as an power supply wire for power supply. Note that, although not illustrated in FIG. 1, power supply wires that connect the right ECU 41 to the display 311, the device connection unit 312, the TCU 313, the LIDAR 314, the camera 315, the DoIP 316, the BCM 317, and the loads 318 to 320 may also be provided as branch lines 7*a*.

A display 322 for an electron mirror, a display 323 for navigation, a LIDAR 324 for performing image detection and ranging in front of the vehicle 2 on its central side, a camera 325 that captures an image in front of the vehicle 2, a LIDAR 326 for performing image detection and ranging in front of the vehicle 2 on its left side, a camera 327 that captures an image on the left side of the vehicle 2, and a load 328 are connected as loads 3 to the left ECU 42. For example, 100M Ether is used as the communication method of the branch lines 722 that connect the left ECU 42 and these loads 3.

In addition, various loads 329 to 331 are connected as loads 3 to the left ECU 42. For example, CAN or CAN FD is used as the communication method of the branch lines 723 that connect the left ECU 42 and these loads 3.

In addition, loads 332 and 333 are connected as loads 3 to the left ECU 42. The branch lines 724 that connect the left ECU 42 and the loads 332 and 333 function as power supply wires for power supply. Note that, although not illustrated in FIG. 1, power supply wires that connect the left ECU 42 to the displays 322 and 323, the LIDARs 324 and 326, the cameras 325 and 327, and the loads 328 to 331 may also be provided as branch lines 7*a*.

A LIDAR 334 for performing image detection and ranging behind the vehicle 2 on its central side, a camera 335 that captures an image behind the vehicle 2, a locator 336 that manages the positional information of the vehicle 2, and an automated driving unit 337 that manages automated driving of the vehicle 2, for example, an automatic brake are connected as loads 3 to the rear ECU 43. For example, 100M Ether is used as the communication method of the branch lines 732 that connect the rear ECU 43 and these loads 3.

Also, various loads 338 to 340 are connected as loads 3 to the rear ECU 43. For example, CAN or CAN FD is used as the communication method of the branch lines 733 that connect the rear ECU 43 and these loads 3.

In addition, a load 341 is connected as a load 3 to the rear ECU 43. The branch line 734 that connects the rear ECU 43 and the load 341 functions as an power supply wire for power supply. Note that, although not illustrated in FIG. 1, power supply wires that connect the rear ECU 43 to the LIDAR 334, the camera 335, the locator 336, the automated driving unit 337, and the loads 338 to 340 may also be provided as branch lines 7*a*.

In addition, the battery 5 is connected to the rear ECU 43 via an power supply wire 735, and a DC/DC step-down converter 50 for lowering the voltage is connected to the battery 5 via an power supply wire 736.

Functional Configuration of ECUs

Next, a functional configuration of the ECUs 4 will be described with reference to FIG. 3.

Figure 3:
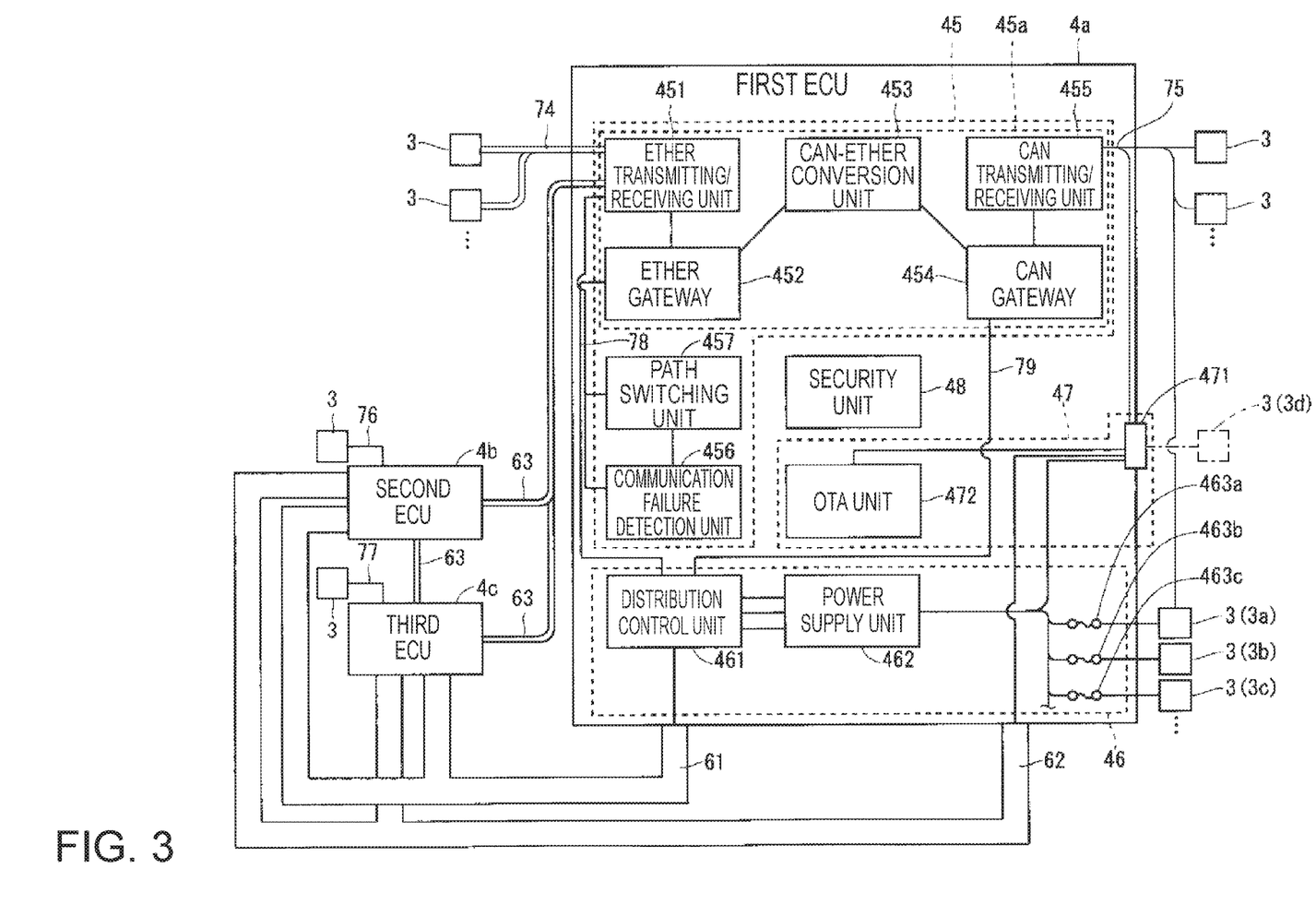
FIG. 3 is a diagram illustrating an example of a functional configuration of ECUs.

FIG. 3 is a diagram illustrating an example of the functional configuration of the ECUs 4. In this embodiment, the right ECU 41, the left ECU 42, and the rear ECU 43 have similar functional configurations, and thus any of these can function as a first ECU 4*a*, a second ECU 4*b*, or a third ECU 4*c* shown in FIG. 3. As a representative example, the functional configuration of the first ECU 4*a* will be described below in detail, and redundant description of the functional configurations of the second ECU 4*b* and the third ECU 4*c* is omitted. In each of the ECUs 4, for example, a communication control unit 45 is configured including a microcomputer for communicating operation information of loads 3, and an power distribution unit 46 is configured including a semiconductor relay for distributing power to the loads 3.

The first ECU 4*a* includes the communication control unit 45, the power distribution unit 46, an add-on unit 47, and a security unit 48. The functions of the units will be described in detail below.

The communication control unit 45 includes, as function units for the first ECU 4*a* to perform communication, an Ether transmitting/receiving unit 451, an Ether gateway 452, a CAN-Ether conversion unit 453, a CAN gateway 454, and a CAN transmitting/receiving unit 455. The communication control unit 45 also includes a communication failure detection unit 456 and a path switching unit 457, as function units for switching a communication path of the first ECU 4*a* when the communication path fails.

The Ether transmitting/receiving unit 451 is a function unit that transmits/receives information to/from the outside using 1G Ether or 100M Ether.

The Ether transmitting/receiving unit 451 of the first ECU 4*a* is connected to Ether transmitting/receiving units of the second ECU 4*b* and the third ECU 4*c* by communication lines 63 on which communication is performed using 1G Ether. In addition, the Ether transmitting/receiving unit of the second ECU 4*b* and the Ether transmitting/receiving unit of the third ECU 4*c* are also connected to each other using a communication line 63.

In addition, the Ether transmitting/receiving unit 451 of the first ECU 4*a* is connected to a plurality of loads 3 by a plurality of branch lines 74 on which communication is performed through Ether communication. If the first ECU 4*a* is the right ECU 41, as a configuration in which communication using 100M Ether is performed, the above plurality of loads 3 shown in FIG. 3 include the LIDAR 314, the camera 315, and the DoIP 316 shown in FIG. 1, and the above plurality of branch lines 74 shown in FIG. 3 include the plurality of branch lines 712 shown in FIG. 1. In addition, as a configuration in which communication using 1G Ether is performed, the above plurality of loads 3 shown in FIG. 3 include the display 311, the device connection unit 312, and the TCU 313, and the above plurality of branch lines 74 shown in FIG. 3 further include the plurality of branch lines 711 shown in FIG. 1 (see FIG. 1 as well).

If the first ECU 4*a* is the left ECU 42, the above plurality of loads 3 shown in FIG. 3 correspond to the displays 322 and 323, the LIDARs 324 and 326, the cameras 325 and 327, and the load 328 shown in FIG. 1. The above plurality of branch lines 74 shown in FIG. 3 correspond to the plurality of branch lines 722 shown in FIG. 1.

If the first ECU 4*a* is the rear ECU 43, the above plurality of loads 3 shown in FIG. 3 correspond to the LIDAR 334, the camera 335, the locator 336, and the automated driving unit 337 shown in FIG. 1. The above plurality of branch lines 74 shown in FIG. 3 correspond to the plurality of branch lines 732 shown in FIG. 1.

The Ether gateway 452 is a function unit that relays transmission/receiving of information using 1G Ether or 100M Ether, in the first ECU 4*a*. The Ether gateway 452 transmits information received from the Ether transmitting/receiving unit 451, to the CAN-Ether conversion unit 453 or an power supply unit 462, which will be described later. Similarly, the Ether gateway 452 transmits information received from the CAN-Ether conversion unit 453, to the power supply unit 462 or the Ether transmitting/receiving unit 451.

The CAN-Ether conversion unit 453 is a function unit that converts a communication protocol. The CAN-Ether conversion unit 453 converts the communication protocol of information received from the Ether gateway 452, from 1G Ether or 100M Ether into CAN or CAN FD, and transmits the information subjected to the conversion, to the CAN gateway 454. Similarly, the CAN-Ether conversion unit 453 converts an information communication protocol received from the CAN gateway 454, from CAN or CAN FD into 1G Ether or 100M Ether, and transmits the information subjected to the conversion, to the Ether gateway 452.

The CAN gateway 454 is a function unit that relays transmission/receiving of information using CAN or CAN FD, in the first ECU 4a. The CAN gateway 454 transmits information received from the CAN transmitting/receiving unit 455, to the CAN-Ether conversion unit 453 or the power supply unit 462, which will be described later. Similarly, the CAN gateway 454 transmits information received from the CAN-Ether conversion unit 453, to the power supply unit 462 or the CAN transmitting/receiving unit 455.

The CAN transmitting/receiving unit 455 is a function unit that transmits/receives information to/from the outside using CAN or CAN FD.

The CAN transmitting/receiving unit 455 of the first ECU 4a is connected to a plurality of loads 3 by a plurality of branch lines 75 on which communication is performed using CAN or CAN FD. If the first ECU 4a is the right ECU 41, the above plurality of the loads 3 shown in FIG. 3 correspond to the BCM 317 and the loads 318 to 320 shown in FIG. 1. The above plurality of branch lines 75 shown in FIG. 3 correspond to the plurality of branch lines 713 shown in FIG. 1.

If the first ECU 4a is the left ECU 42, the above plurality of the loads 3 shown in FIG. 3 correspond to the loads 329 to 331 shown in FIG. 1. The above plurality of branch lines 75 shown in FIG. 3 correspond to the plurality of branch lines 723 shown in FIG. 1.

If the first ECU 4a is the rear ECU 43, the above plurality of the loads 3 shown in FIG. 3 correspond to the loads 338 to 340 shown in FIG. 1. The above plurality of branch lines 75 shown in FIG. 3 correspond to the plurality of branch lines 733 shown in FIG. 1.

In addition, the CAN transmitting/receiving unit 455 of the first ECU 4a is connected to a connector 471 to be described later, by a branch line 75 using CAN or CAN FD.

In this manner, the Ether transmitting/receiving unit 451, the Ether gateway 452, the CAN-Ether conversion unit 453, the CAN gateway 454, and the CAN transmitting/receiving unit 455 function as an input/output unit 45a that inputs/outputs (transmits/receives) a signal so as to enable conversion of the communication method between 1G Ether or 100M Ether and CAN or CAN FD.

The communication failure detection unit 456 is a function unit that detects a communication failure of the two communication lines 63 connected to the first ECU 4a. Examples of a situation in which such a communication failure occurs include a situation in which one of the above two communication lines 63 fractures, and information communication of the fractured communication line 63 is disabled. When detecting such a communication failure, the communication failure detection unit 456 outputs a switch signal to the path switching unit 457.

The path switching unit 457 is a function unit that switches a communication path using three communication lines 63, due to a switch signal being input from the communication failure detection unit 456.

When the three communication lines 63 function properly, the right ECU 41 and the left ECU 42 communicate with each other via the communication line 631 using 1G Ether, the left ECU 42 and the rear ECU 43 communicate with each other via the communication line 632 using 1G Ether, and the rear ECU 43 and the right ECU 41 communicate with each other via the communication line 633 using 1G Ether, with reference to FIG. 1.

On the other hand, if communication on one of the communication lines 63 (for example, the communication line 631) fails, the communication failure detection unit 456 detects the communication failure via the Ether transmitting/receiving unit 451. The communication failure detection unit 456 outputs a switch signal that includes the detection information, and the path switching unit 457 that has received the switch signal switches the communication path. As a result, the communication path between the right ECU 41 and the left ECU 42 is switched from a normal path (a path formed by the communication line 631 only) to a new path (a path that passes through the communication line 632, the rear ECU 43, and the communication line 633). In this manner, as a result of the three ECUs 4 being connected by a ring-like communication path, each of the ECUs 4 is connected to the two other ECUs 4, using one communication line 63 for each of the two other ECUs 4. As a technique for constructing such a redundant configuration, the technique disclosed in "Front line of router development vol. 9, Ring protocol for realizing redundant LAN path, [1], Uniquely developing mechanism, and building it into hardware to perform high-speed processing, For constructing reliable network (no. 3)", [online], Jan. 14, 2009, Nikkei NETWORK, [retrieved on May 1, 2017], Internet (URL: http://itpro.nikkeibp.co.jp/article/COLUMN/20090105/322216/)

can be used, for example. In addition, an aspect may also be adopted in which, by three or more ECUs 4 being connected, each of the ECUs 4 is connected to the two or more other ECUs 4.

Figure 4:
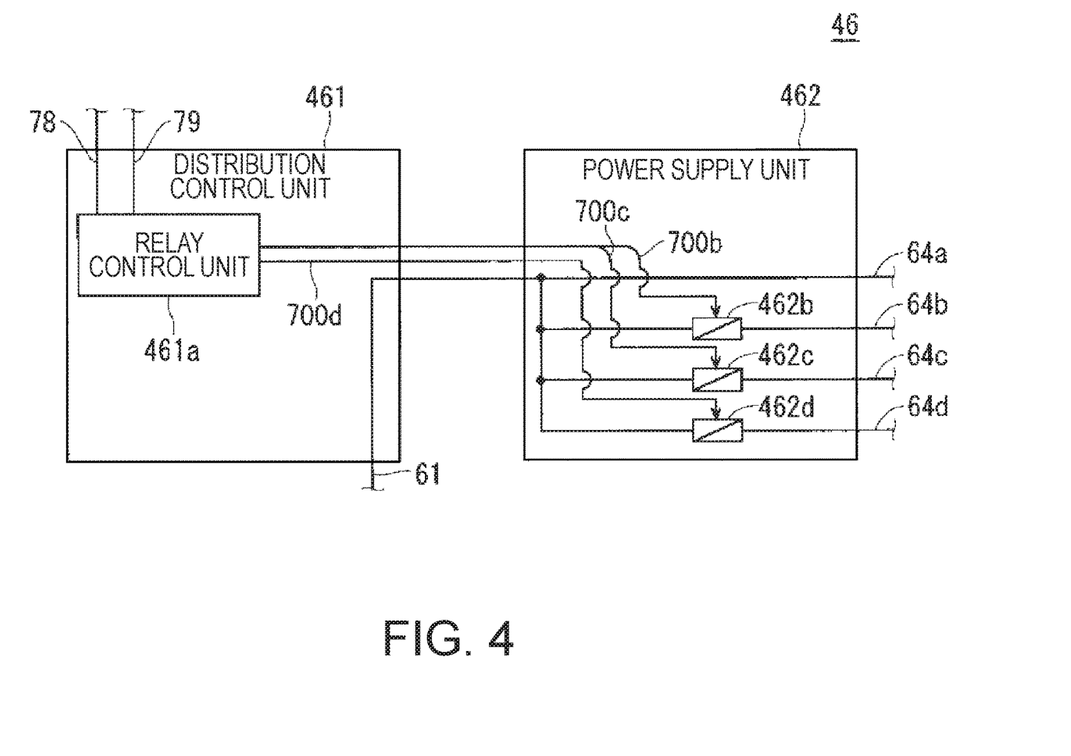
FIG. 4 is a diagram schematically illustrating a configuration example of an power distribution unit.

FIG. 4 is a diagram schematically illustrating a configuration example of the power distribution unit 46. The power distribution unit 46 includes a distribution control unit 461 and the power supply unit 462, as constituent elements for distributing power supplied from the power supply wire 61, to the loads 3.

The distribution control unit 461 is a function unit that performs control so as to distribute power from the power supply wire 61, based on operation information. Here, "operation information" refers to information that serves as a reference for determining whether to operate or stop a load 3. For example, the operation information includes information indicating a state where the vehicle 2 needs to use constant power (expressed as "+B" in FIG. 3, and, hereinafter, referred to as "+B state"), information indicating a state where the vehicle 2 needs to use automobile accessory power (expressed as "ACC" in FIG. 3, and, hereinafter, referred to as "ACC state"), and information indicating a state where the vehicle 2 needs to use ignition power (expressed as "IG" in FIG. 3, and, hereinafter, referred to as "IG state"). Acquisition of the operation information will be described later.

The distribution control unit 461 is configured by including a relay control unit 461a. The relay control unit 461a is connected to the Ether gateway 452 by a communication line 78, and is connected to the CAN gateway 454 by a communication line 79. A signal that includes the operation information is input to the relay control unit 461a via at least one of the communication lines 78 and 79. In addition, a type signal, which will be described later, is input to the relay control unit 461a via the communication line 79.

The power supply unit 462 is a function unit that is connected to the distribution control unit 461, and distributes and supplies power to the loads 3 under control of the distribution control unit 461. For example, the power supply unit 462 includes four power supply wires 64a to 64d to which power supplied from the power supply wire 61 is distributed, and three semiconductor relays 462b to 462d provided respectively for the three power supply wires 64b to 64d. The three semiconductor relays 462b to 462d are connected to the relay control unit 461a via communication lines 700b to 700d.

The power supply wire 64a is an power supply path for supplying constant power to a load 3a, and is conductive in all of the +B state, the ACC state, and the IG state. The power supply wire 64b is an power supply path for supplying automobile accessory power to a load 3b, and is non-conductive in the +B state and conductive in the ACC state and the IG state due to the semiconductor relay 462b. The semiconductor relay 462b controls opening/closing (conduction/non-conduction) of the power supply wire 64b based on operation information acquired via the communication line 700b. The power supply wire 64c is an power supply path for supplying ignition power to a load 3c, and is non-conductive in the +B state and the ACC state and conductive in the IG state due to the semiconductor relay 462c. The semiconductor relay 462c controls opening/closing (conduction/non-conduction) of the power supply wire 64c based on operation information acquired via the communication line 700c. The power supply wire 64d is an power supply path for supplying one of constant power, automobile accessory power, and ignition power to a load 3d, and a semiconductor relay 462d controls conduction/non-conduction (opening/closing) of the power supply wire 64d. The semiconductor relay 462d controls opening/closing of the power supply wire 64d based on operation information acquired via the communication line 700d and a type signal to be described later, In the example shown in FIG. 3, power that is output from the power supply unit 462 is supplied to the loads 3a to 3c and the connector 471. The load 3a is a device that is supplied with power when the vehicle 2 is in the +B state, the ACC state, or the IG state, and then operates, such as the BCM 317. The load 3b is a device that is supplied with power when the vehicle 2 is in the ACC state or the IG state, and then operates, such as the display 323 for navigation. The load 3c is a device that is supplied with power when the vehicle 2 is in the IG state, and then operates, such as the automated driving unit 337. Note that fuses 463a to 463c are provided respectively between the power supply unit 462 and the loads 3a to 3c. More specifically, as shown in FIG. 4, the load 3a is connected to the power supply wire 64a via the fuse 463a, the load 3b is connected to the power supply wire 64b via the fuse 463b, and the load 3c is connected to the power supply wire 64c via the fuse 463c.

The add-on unit 47 includes the connector 471 for adding and connecting a load 3d, as a load 3, from the outside of the first ECU 4a and an OTA (Over the Air) unit 472 that operates the load 3d using an operation program. Add-on processing for adding a function to the first ECU 4a using the connector 471 and the OTA unit 472 will be described later.

The security unit 48 performs processing for authenticating an external device outside of the first ECU 4a, when communicating with the external device, and processing for determining whether or not information that has been input from the outside is proper. With reference to FIG. 1, in the right ECU 41 connected, via the branch line 711, to the device connection unit 312 and the TCU 313, both of which perform wireless communication with an external device, the security standard of the security unit 48 is set to be higher compared with the left ECU 42 or the rear ECU 43. Accordingly, a function of preventing unauthorized access from the outside to the on-board system 1 such as hacking is improved. If functions for communicating with an external device outside of the on-board system 1 are concentrated in one ECU 4 (specifically, the right ECU 41) as in this embodiment, it suffices for the security standard to be set higher only in the one ECU 4, and an unauthorized access can be prevented with a simple configuration.

Power Supply Processing and Information Communication Processing

Next, an example of processing performed in the on-board system 1 when the user switches the state of the vehicle 2 from the +B state to the ACC state will be described with reference to FIGS. 1 and 3. In this example, the first ECU 4a corresponds to the right ECU 41, the second ECU 4b corresponds to the left ECU 42, and the third ECU 4c corresponds to the rear ECU 43.

As a result of the user performing processing for driving the vehicle 2, for example, insertion and rotation of a key or an operation on a push start button, the state of the vehicle 2 is switched from the +B state to the ACC state. The BCM 317 detects this switch, and generates a signal including operation information indicating that the vehicle 2 is in the ACC state. The generated signal is output from the BCM 317, and is input to the CAN transmitting/receiving unit 455 of the right ECU 41 through the branch line 713. Here, communication lines through which the operation information is transmitted from among the communication lines are particularly referred to as "operation signal lines". At this time, the branch line 713 functions particularly as an input operation signal line through which the operation information is input to the right ECU 41 from among the operation signal lines.

This signal is output from the CAN transmitting/receiving unit 455, and is input to the CAN gateway 454. The CAN gateway 454 generates a signal including the operation information indicating that the vehicle 2 is in the ACC state, based on the input signal.

This signal is output from the CAN gateway 454, and is input to the distribution control unit 461. The power supply unit 462 then supplies power distributed under control of the above-described distribution control unit 461, to the loads 3. Specifically, the above operation information indicates that the vehicle 2 is in the ACC state, and the relay control unit 461a controls the semiconductor relay 462b via the communication line 700b so as to make the power supply wire 64b and the power supply wire 61 conductive. Accordingly, power is supplied to the load 3b. However, a relay control unit 461b controls the semiconductor relay 462c via the communication line 700c so as to shut off the power supply wire 64c and the power supply wire 61, and thus power is not supplied to the load 3c.

This signal is output from the CAN gateway 454, and is also input to the CAN-Ether conversion unit 453. The CAN-Ether conversion unit 453 converts the communication method of the above input signal from CAN or CAN FD into 1G Ether.

The signal subjected to the conversion is output from the CAN-Ether conversion unit 453, and is input to the Ether gateway 452.

This signal is output from the Ether gateway 452, and is input to the Ether transmitting/receiving unit 451. The Ether transmitting/receiving unit 451 generates a signal that includes the operation information indicating that the vehicle 2 is in the ACC state, based on the input signal.

This signal is output from the Ether transmitting/receiving unit 451, and is input to the left ECU 42 via the communication line 631. At this time, from the viewpoint of the right ECU 41, the communication line 631 functions particularly as an output operation signal line for outputting the operation information from the right ECU 41, from among the operation signal lines, and, from the viewpoint of the left ECU 42, functions particularly as an input operation signal line for inputting the operation information to the left ECU 42, from among the operation signal lines.

This signal is input to a distribution control unit (corresponding to "the distribution control unit 461" shown in FIG. 3) via an Ether transmitting/receiving unit (corresponding to "the Ether transmitting/receiving unit 451" shown in FIG. 3) and an Ether gateway (corresponding to "the Ether gateway 452" shown in FIG. 3) in the left ECU 42. Then, in the left ECU 42, an power supply unit (corresponding to "the power supply unit 462" shown in FIG. 3) supplies power distributed under control of the distribution control unit, to the loads 3, based on the operation information included in the input signal. In order to avoid complicated illustration, FIG. 3 shows a state where the second ECU 4b corresponding to the left ECU 42 is connected to one load 3 via a branch line 76. Note that the second ECU 4b may be connected to a plurality of loads via a plurality of branch lines.

The signal that includes the operation information and has been output from the Ether transmitting/receiving unit 451 is also input to the rear ECU 43 via the communication line 633. At this time, from the viewpoint of the right ECU 41, the communication line 633 functions particularly as an output operation signal line for outputting the operation information from the right ECU 41, from among the operation signal lines, and, from the viewpoint of the rear ECU 43, functions particularly as an input operation signal line for inputting the operation information to the rear ECU 43, from among the operation signal lines.

This signal is input to a distribution control unit (corresponding to "the distribution control unit 461" shown in FIG. 3) via an Ether transmitting/receiving unit (corresponding to "the Ether transmitting/receiving unit 451" shown in FIG. 3) and an Ether gateway (corresponding to "the Ether gateway 452" shown in FIG. 3) in the rear ECU 43. Then, in the rear ECU 43, an power supply unit (corresponding to "the power supply unit 462" shown in FIG. 3) supplies power distributed under control of the distribution control unit, to the loads 3 based on the operation information included in the input signal. In order to avoid complicated illustration, FIG. 3 shows a state where the third ECU 4c corresponding to the rear ECU 43 is connected to one load 3 via a branch line 77. Note that the third ECU 4c may also be connected to a plurality of loads via a plurality of branch lines.

An aspect has been described so far in which operation information indicates the ACC state, but an aspect may also be adopted in which operation information indicates the IG state. Also in this aspect, similarly to the former aspect, operation information is transmitted from one ECU 4 to the two other ECUs 4, and, in the ECUs 4, power is supplied to the loads 3 based on the operation information. For example, to give a description with reference to FIG. 4, the relay control unit 461a controls the semiconductor relay 462b and 462c via the communication lines 700b and 700c so as to make the power supply wires 64b and 64c and the power supply wire 61 conductive. Accordingly, power is supplied to the loads 3b and 3c.

In this manner, the operation signal lines are composed of an input operation signal line for inputting operation information and output operation signal lines for outputting operation information. The input/output unit 45a of the right ECU 41 is connected to the branch line 713, which is an input operation signal line, and the communication lines 631 and 633, which are output operation signal lines, and has a function of outputting the operation information input from the input operation signal line, to the output operation signal lines. In addition, an input/output unit of the left ECU 42 (a function unit corresponding to the input/output unit 45a of the right ECU 41) is connected to the communication line 631, which is an input operation signal line, and has a function of acquiring operation information from the input operation signal line. Also, an input/output unit of the rear ECU 43 (a function unit corresponding to the input/output unit 45a of the right ECU 41) is connected to the communication line 633, which is an input operation signal line, and a function of acquiring operation information from the input operation signal line.

In this embodiment, each of the ECUs 4 has a communication distribution function for distributing operation information between a plurality of in-vehicle networks and a power distribution function for distributing power to the loads 3 based on this operation information. Thus, in an aspect of this embodiment, it is possible to reduce the number of members that constitute in-vehicle networks, compared with an aspect in which these functions are separately provided (for example, the aspect in FIG. 5 to be described later).

Figure 5:
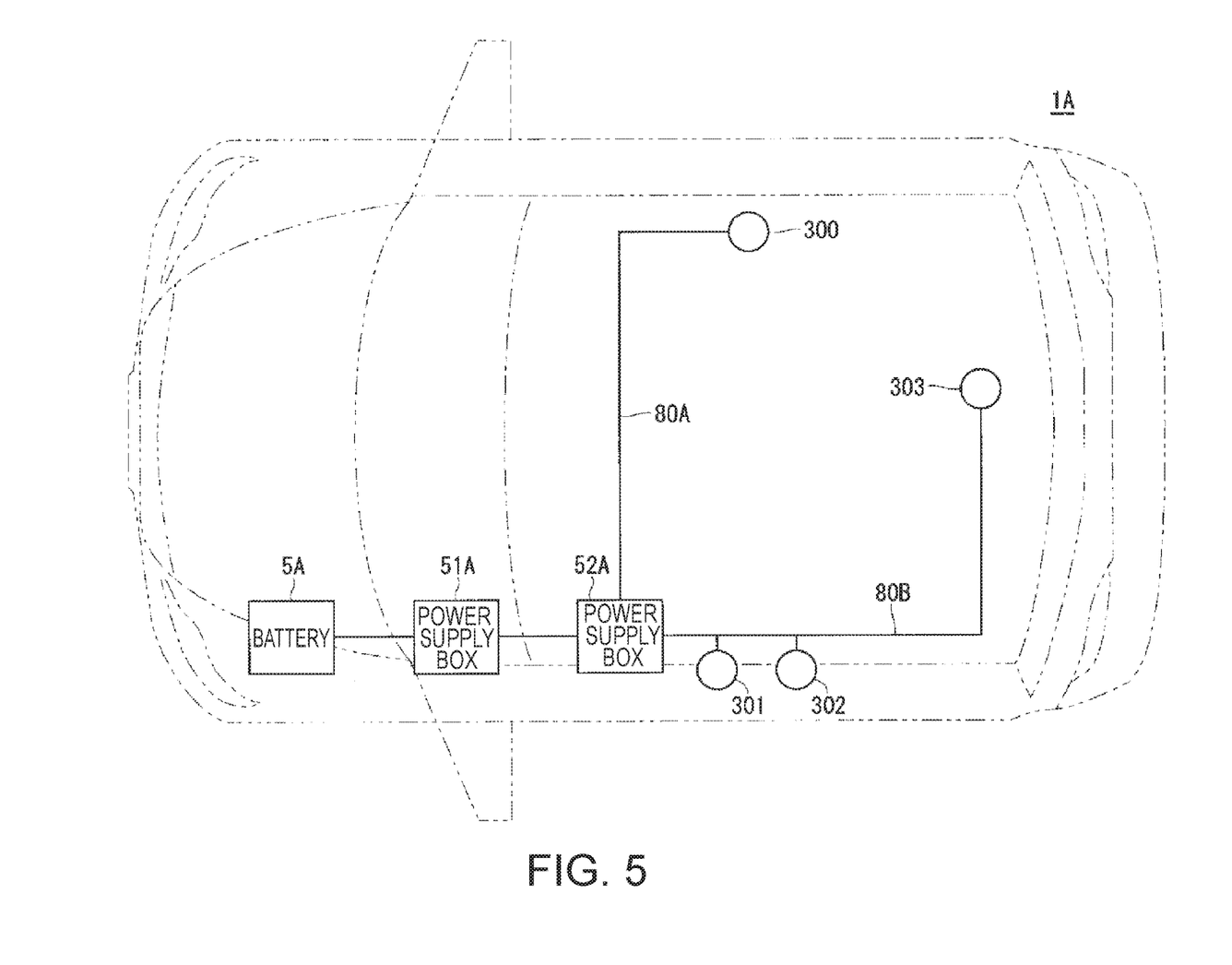
FIG. 5 is a diagram schematically illustrating a configuration example of an on-board system according to a comparison example of an embodiment of the present disclosure.

FIG. 5 shows an on-board system 1A according to a comparison example of this embodiment. In this on-board system 1A, power is distributed from a battery 5A provided on the front left side of a vehicle 2A, to loads 300 to 303 via power supply boxes 51A and 52A and power supply wires 80A and 80B. Note that a load to which power is distributed from the power supply box 51A is not illustrated.

The power supply box 52A is connected, by an power supply wire 80A, to the load 300 to be supplied with power even in the +B state. The power supply box 52A is connected, by an power supply wire 80B, to the loads 301 to 303 that are not to be supplied with power in the +B state, and are to be supplied with power in the ACC state or the IG state. In this comparison example, the above-described transmission of operation information and supply of power that is based on operation information are not performed. In this case, supply of power that depends on whether the vehicle is in the +B state or the ACC state is realized by implementing the power supply wires 80A and 80B from the power supply box 52A. Thus, when power is supplied to a load 3 whose distance from the power supply box 52A is large, the total routing distance of each of the power supply wires 80A and 80B is longer. In addition, if the number of loads 3 is large, this issue becomes significant.

In contrast, in the on-board system 1 of this embodiment, the three ECUs 4 are disposed as distributors in locations (specifically, the front right side, front left side, and back central side of the vehicle 2) where the loads 3 are likely to concentrate. In addition, the ECUs 4 are connected by the power supply wires 61 and 62 so as to enable power supply, and are connected by the three communication lines 63 so as to enable information communication. Furthermore, each of the ECUs 4 is connected to a load 3 via a branch line 7a so as to be able to supply power to the load 3, and is connected to the load 3 via a branch line 7b so as to be able to perform information communication with the load 3. Thus, each load 3 can be supplied with power from an ECU 4 near the load 3 and perform information communication with the ECU 4, and it is possible to reduce the number of members that constitute in-vehicle networks. In particular, as a result of the three communication lines 63 functioning as operation signal lines for transmitting operation information, routing of wires for power distribution becomes easy. This effect is similar even if the number of loads 3 is large. Note that the number of ECUs 4 is not limited to three, and, in any aspect in which a plurality of the ECUs 4 are connected by operation signal lines and power supply wires, a similar effect is acquired.

Add-On Processing

Next, an example of add-on processing that is executed by the add-on unit 47 will be described with reference to FIGS. 1 and 3.

When the load 3d is connected to the connector 471, a signal that includes the operation type of the load 3d as information (hereinafter, referred to as "type signal") is output from the load 3d, and is input to the CAN transmitting/receiving unit 455 via the connector 471 and the branch line 75. The type signal is input to the CAN-Ether conversion unit 453 via the CAN transmitting/receiving unit 455 and the CAN gateway 454. The CAN-Ether conversion unit 453 then converts the communication method of the type signal from CAN or CAN FD into 1G Ether or 100M Ether. The type signal subjected to the conversion is output from the CAN-Ether conversion unit 453, and is input to the Ether transmitting/receiving unit 451 via the Ether gateway 452. Here, "operation type" is information indicating the type of the load 3d, and, for example, indicates whether the load 3d operates at a timing of the +B state, the ACC state, or the IG state.

If the first ECU 4a is the right ECU 41, a type signal is output from the Ether transmitting/receiving unit 451, and is input to the device connection unit 312 or the TCU 313 via the branch line 711 using 1G Ether. Then, the device connection unit 312 or the TCU 313 to which the type signal has been input receives the above-described operation program from a server (not illustrated) through wireless communication, outputs the operation program, and inputs this operation program to the first ECU 4a via the branch line 711. As a result of the OTA unit 472 executing this operation program, the first ECU 4a can operate the load 3d added afterwards.

In addition, if the first ECU 4a is the left ECU 42 or the rear ECU 43, a type signal is output from the Ether transmitting/receiving unit 451, and is input to the right ECU 41 via the communication line 631 or the communication line 633 using 1G Ether. The right ECU 41 then acquires an operation program in this manner. This operation program is output from the first ECU 4a, and is input to the left ECU 42 or the rear ECU 43 via the communication line 631 or the communication line 633 using 1G Ether. As a result of the OTA unit 472 executing this operation program, the left ECU 42 or the rear ECU 43 can operate the load 3d added afterwards.

In this manner, the input/output unit 45a of the first ECU 4a acquires the operation type of the load 3d connected to the connector 471, from the load 3d via the connector 471, and inputs/outputs information indicting this operation type (more specifically, for example, a type signal).

In addition, the power supply unit 462 distributes power to the load 3d connected to the connector 471, via the connector 471, based on the above-described information indicating the operation type and the above-described operation information. For example, if the load 3d is a back camera, the load 3d is supplied with power when the vehicle 2 is in the IG state, and operates. Thus, with reference to FIGS. 3 and 4, the above-described type signal and a signal that includes the above-described operation information are transmitted via the communication line 700d, the distribution control unit 461 controls opening/closing of the semiconductor relay 462d, and the power supply unit 462 supplies power to the load 3d via the power supply wire 64d and the connector 471. In addition, in supply of power to the load 3d, the connector 471 is grounded via the power supply wire 62.

Various methods can be used as a connection method of the connector 471, but, for example, USB (Universal Serial Bus) is adopted. In this embodiment, a function can be easily added to the on-board system 1 through add-on processing that is performed by the add-on unit 47.

In addition, in the on-board system 1 of this embodiment, each of the ECUs 4 is arranged at a corner of a vehicle, and thus, even when the load 3d is added at a corner of the vehicle afterwards, it is possible to suppress the routing distance of a member that connects the load 3d and the ECU 4.

The distributor and on-board system have been described above in detail, but the above description is illustrative in all phases, and the distributor and on-board system are not limited thereto. It is understood that innumerable modified examples that are not illustrated can be envisioned without departing from the scope of the distributor and on-board system.

The invention claimed is:

1. A power distributor configured to be connected to a power supply wire laid in a vehicle, a load for the vehicle to be supplied with power from the power supply wire, and an operation signal line through which operation information serving as a reference for determining whether or not to supply power to the load is transmitted, the power distributor comprising:
    an electronic control unit configured to distribute power that is supplied from the power supply wire to the load, based on the operation information, wherein:
    the vehicle includes at least three ECUs each of which includes the power distributor including the electronic control unit, such that the power distributor included inside each of the at least three ECUs supplies power to a respective load,
    the at least three ECUs are connected to each other by the same power supply wire,
    the at least three ECUs are connected to each other by the operation signal line which includes at least three communication lines, each communication line connecting two out of the at least three ECUs,
    the power distributor included inside each of the at least three ECUs exchanges the operation information with each other via the at least three communication lines, and
    the power distributor included inside each of the at least three ECUs is disposed at a respective corner of the vehicle.

2. The power distributor according to claim 1, wherein the electronic control unit of the power distributor included inside each of the at least three ECUs includes:
    a distribution control unit that performs control so as to distribute power from the same power supply wire, based on the operation information; and a power supply unit that is connected to the distribution control unit, distributes power under control of the distribution control unit, and supplies the power to the respective load.

3. The power distributor according to claim 2, wherein the operation signal line includes an input operation signal line through which the operation information is input and an output operation signal line through which the operation information is output, and the power distributor included inside each of the at least three ECUs includes an input/output that is connected to the input operation signal line and the output operation signal line, and outputs the operation information input from the input operation signal line, to the output operation signal line.

4. The power distributor according to claim 3, wherein the input/output converts a communication method of the operation information input from the input operation signal line, and outputs the input operation information to the output operation signal line.

5. The power distributor according to claim 2, wherein the operation signal line includes an input operation signal line through which the operation information is input.

6. The power distributor according to claim 2, further comprising:

a connector for adding and connecting a new load, wherein the distribution control unit acquires an operation type of the new load connected to the connector, from the added load via the connector, and the power supply unit distributes the power to the new load connected to the connector, via the connector, based on information indicating the operation type and the operation information.

7. The power distributor according to claim 6, wherein the information indicating the operation type is output to the outside, and an operation program that is based on the operation type is input from the outside, and the new load connected to the connector operates using the operation program.

8. The power distributor according to claim 1, wherein the respective corner of the vehicle includes a corner on a back side of the vehicle.

9. The power distributor according to claim 1, wherein the respective corner of the vehicle includes a corner on a right or left side in a width direction of the vehicle.

10. The power distributor according to claim 1, wherein the respective corner of the vehicle includes a corner of a roof of the vehicle.

11. An on-board system comprising:

a plurality of distributors, each of which is configured as the power distributor according to claim 1 and is included inside of each of the at least three ECUs in the vehicle, wherein the plurality of distributors are connected to each other by the operation signal line and the same power supply wire.

12. The on-board system according to claim 11, wherein:

the plurality of distributors includes three or more distributors, wherein each communication line of the at least three communication lines in the operation signal line connects a different set of two distributors among the plurality of distributors.

13. The on-board system according to claim 11, wherein:

the plurality of distributors are disposed either at a corner on a front right side of the vehicle, at a corner on a front left side of the vehicle, or at a corner on a back central side of the vehicle, and each of the plurality of distributors and two other distributors of the plurality of distributors are connected to each other, using the operation signal line for each of the two other distributors, and each of the plurality of distributors and the two other distributors are connected to each other by the same power supply wire.

14. The on-board system according to claim 13, wherein:

the power supply wire is laid in a T-shaped manner in a planar view, in the vehicle, and the at least three communication lines of the operation signal line that connect the plurality of distributors to each other are laid to overlap the power supply wire.

* * * * *